INVENTORS
Normand Bergeron
Allen C. Harriman
Antoni L. Sitko

Nov. 11, 1969  N. BERGERON ET AL  3,477,079
UPPER PULLING OVER AND SHIFTING MECHANISM AND METHOD
Filed June 23, 1967  12 Sheets-Sheet 4

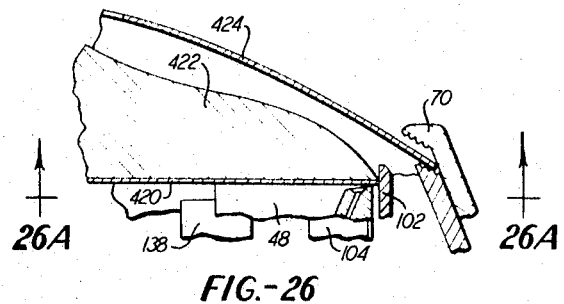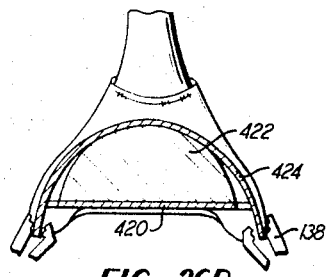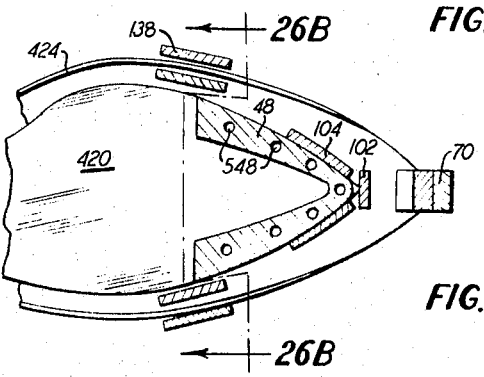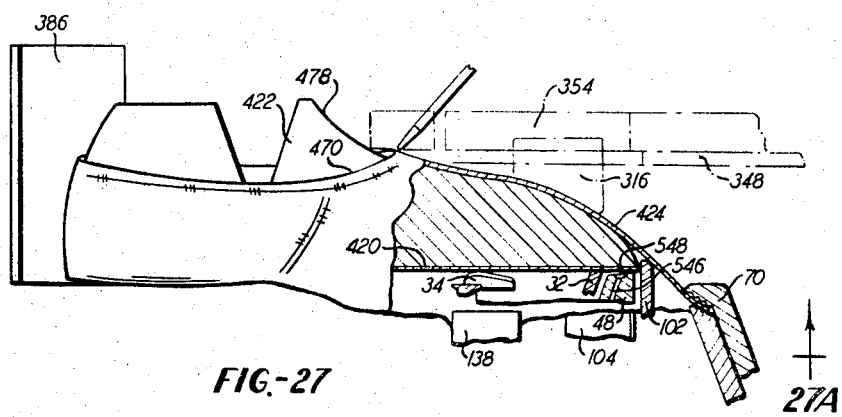

United States Patent Office 3,477,079
Patented Nov. 11, 1969

3,477,079
UPPER PULLING OVER AND SHIFTING
MECHANISM AND METHOD
Normand Bergeron, Montreal, Quebec, Canada, and Allen
C. Harriman, Brockton, and Antoni L. Sitko, Cambridge, Mass., assignors to Jacob S. Kamborian, West
Newton, Mass.
Filed June 23, 1967, Ser. No. 648,360
Int. Cl. A43d 21/00, 23/00, 9/00
U.S. Cl. 12—142                                26 Claims

ABSTRACT OF THE DISCLOSURE

There is disclosed herein a machine and method for stretching the toe and forepart portion of an upper about a last by side pincers that grip and pull the forepart portions of the upper margin and a front pincers that grips and pulls the toe end portion of the upper margin. A handle is connected to each side pincers to enable the side pincers and the gripped forepart portions of the upper margin to be shifted in forward-rearward directions to thereby relocate the upper on the last and a heel clamp is provided that bears against the heel portion of the last to prevent twisting of the last during the shifting operation.

---

Figure 1:
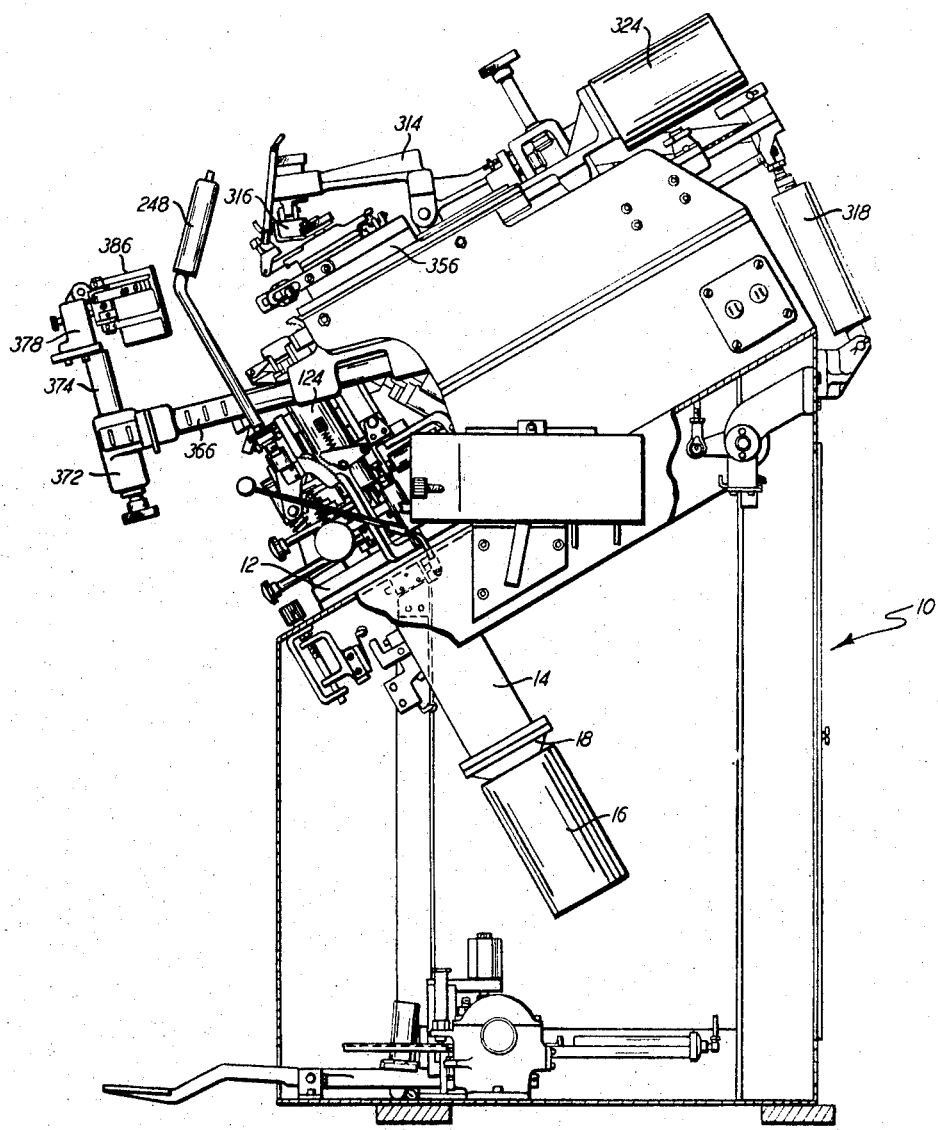

This invention is concerned with a machine for stretching the toe and forepart portions of an upper about a last while the last and upper are supported bottom-down. In machines of this type, side pincers are provided to grip the forepart portions of the upper margin and then move downwardly to thereby effect the stretching operation. The side pincers can also be moved toewardly or heelwardly to thereby shift the upper on the last if it is not properly positioned after the stretching operation.

One aspect of this invention is directed to an improved shifter mechanism which includes a brake that is operative to lock the side pincers against toeward-heelward movement when the stretching operation is completed and that is releasable to allow the shifting to take place.

Another aspect of the invention is directed to a heel clamping arrangement for preventing the twisting of the last while the shifting takes place. This arrangement includes a heel clamp having a pair of divergent clamping members mounted to a holder for swinging movement and which is locked against such movement when the clamp is brought to bear against the last.

Figure 2:
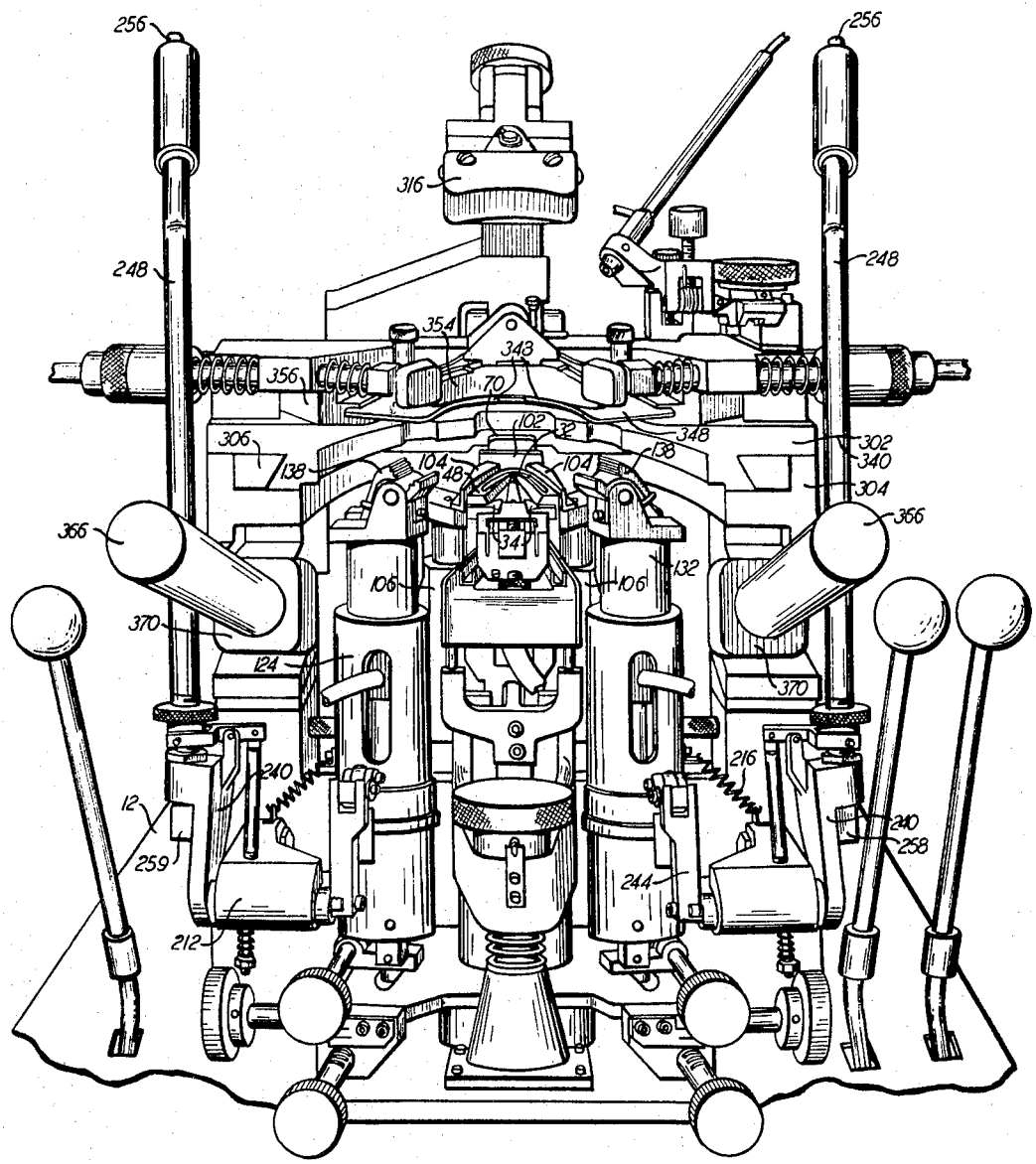
Figure 3:
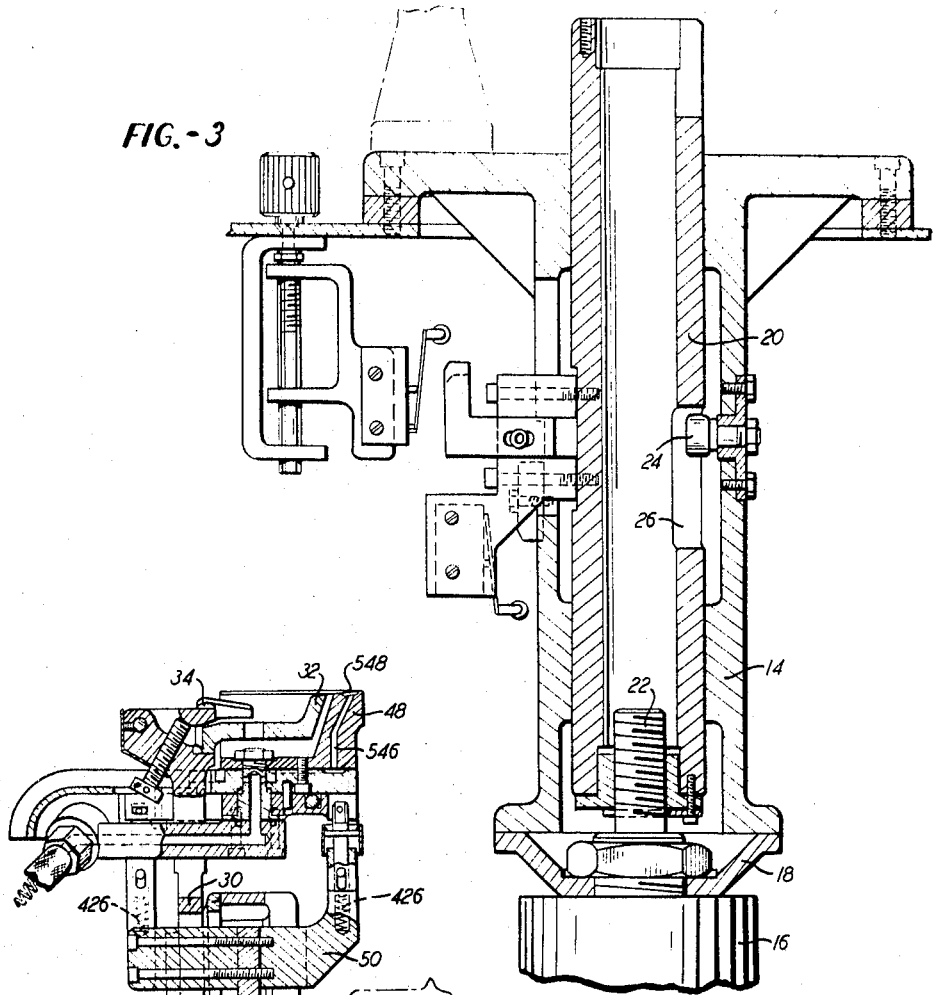
Figure 4:
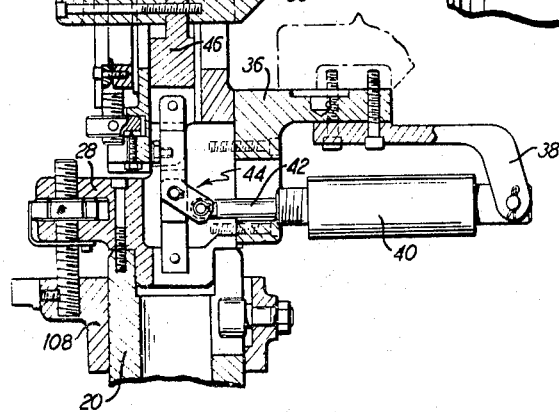
Figures 5, 6:
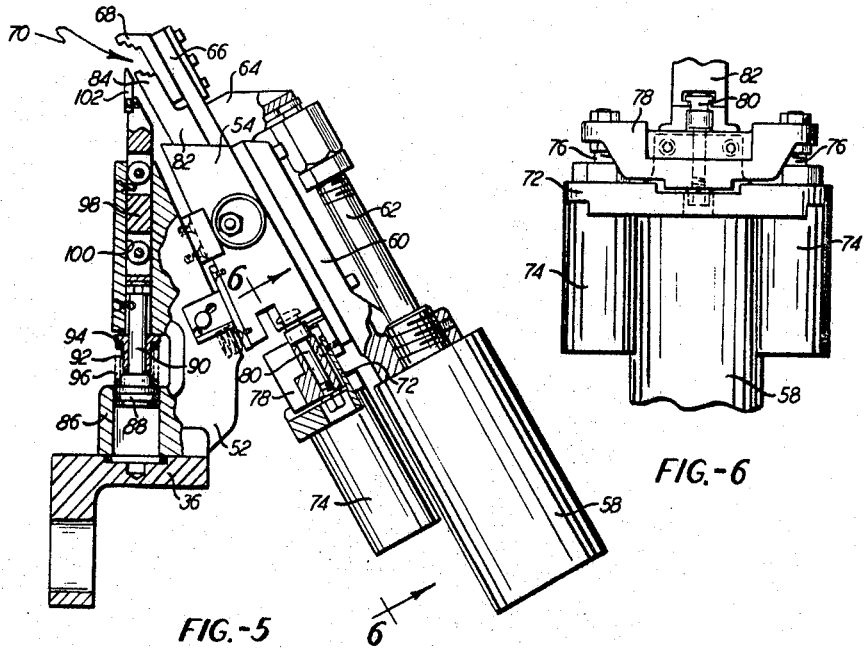
Figures 10, 11:
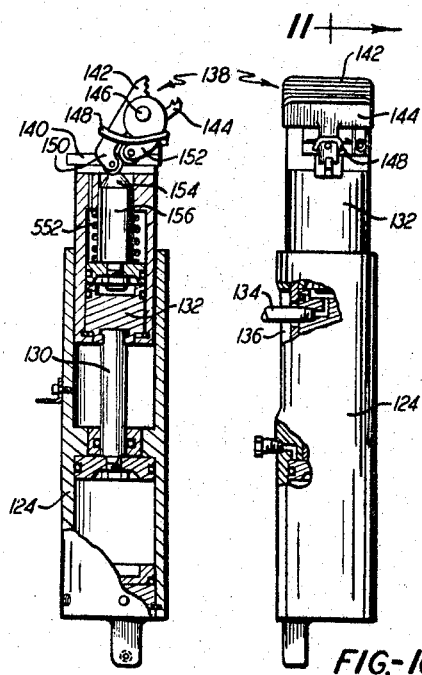
Figure 7:
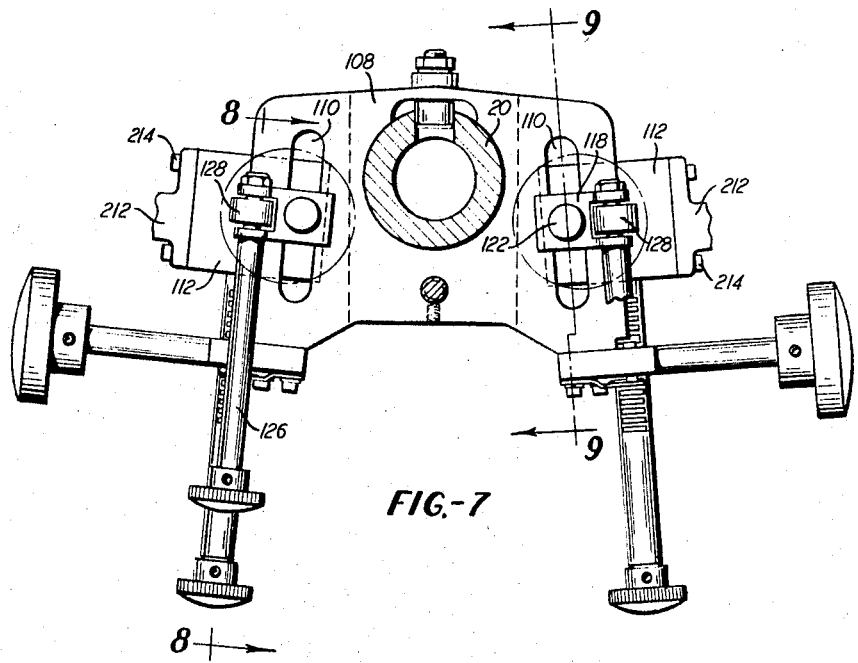
Figure 8:
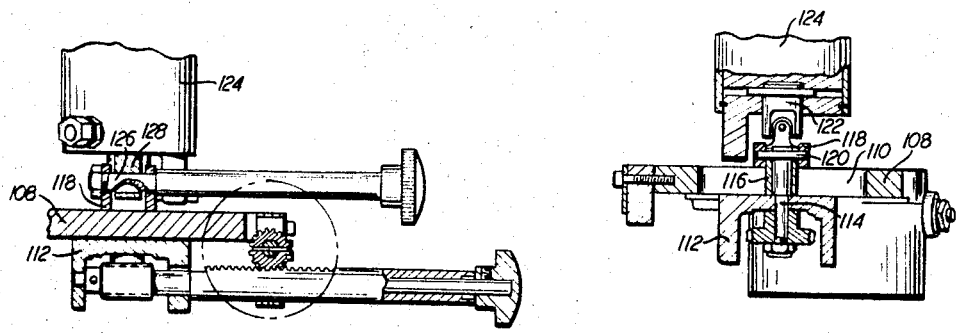
Figure 9:
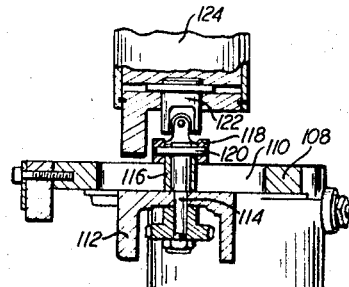
Figure 17:
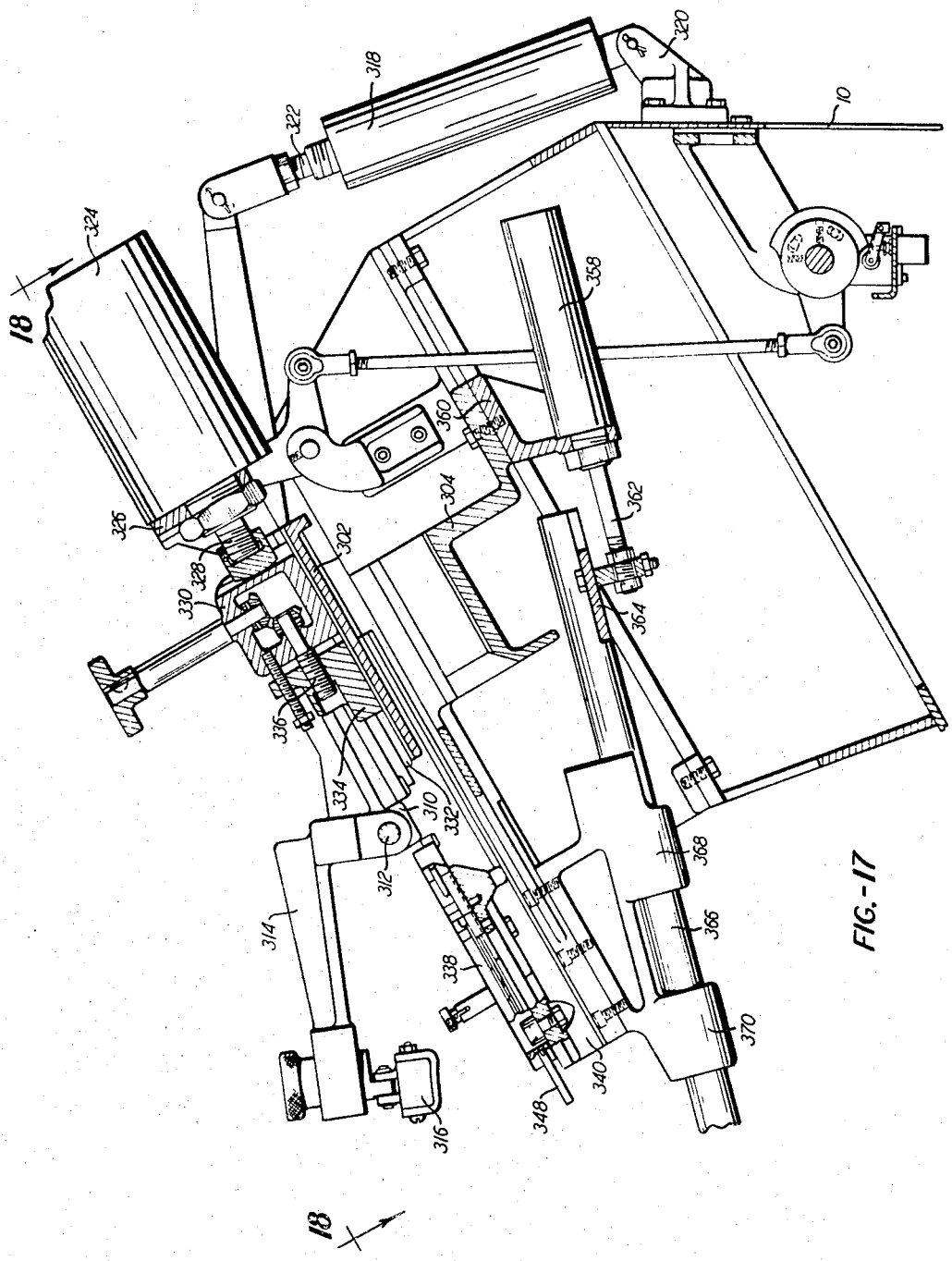
Figure 18:
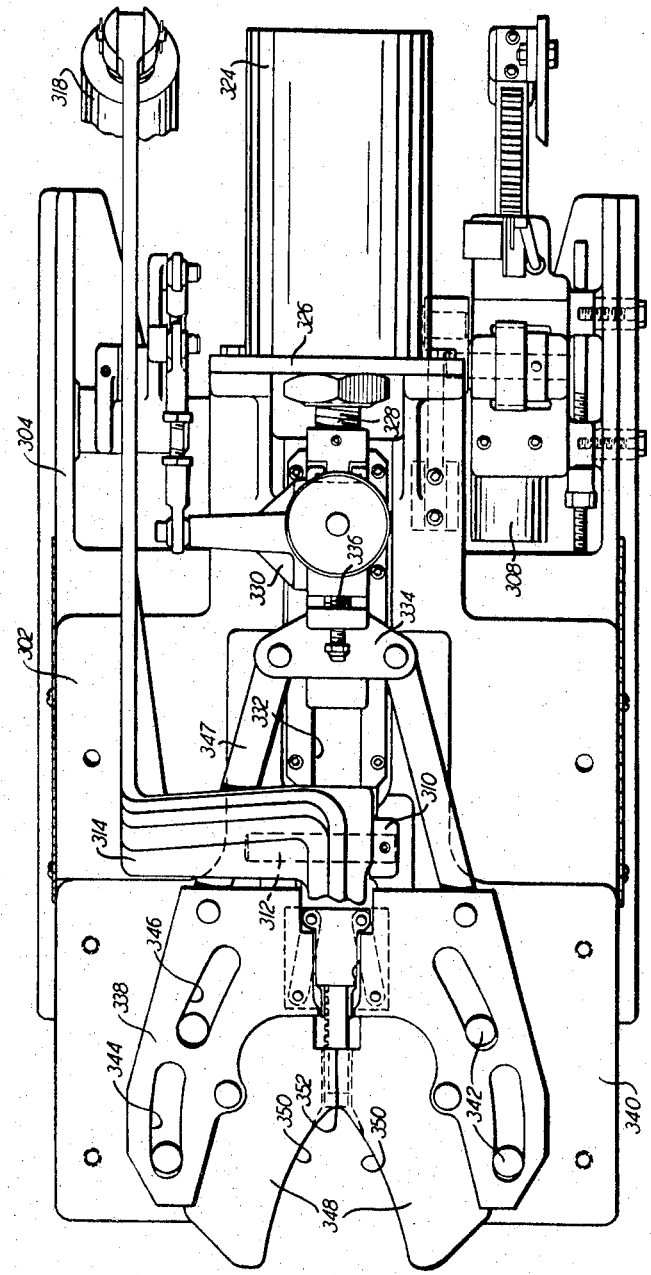
Figure 20:
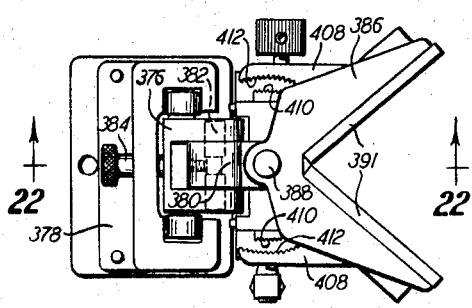
Figure 19:
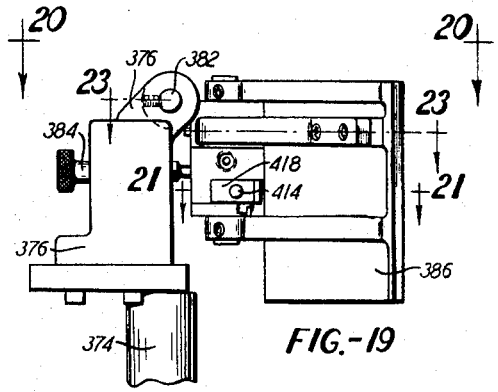
Figure 22:
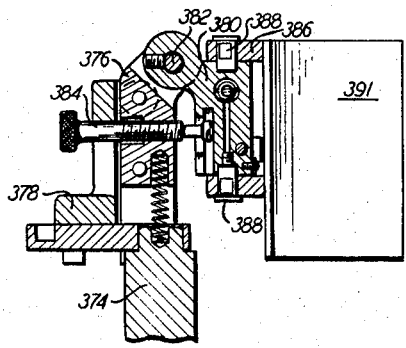
Figure 21:
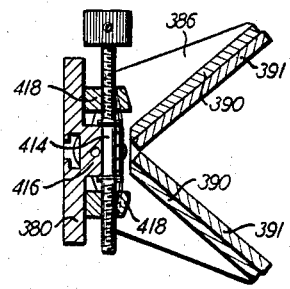
Figure 23:
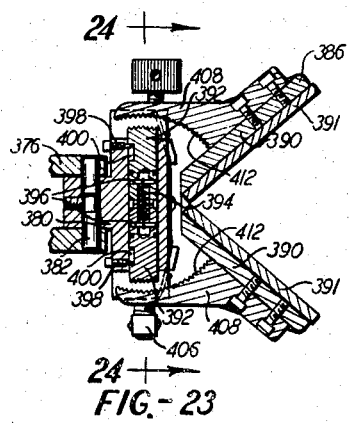
Figure 24:
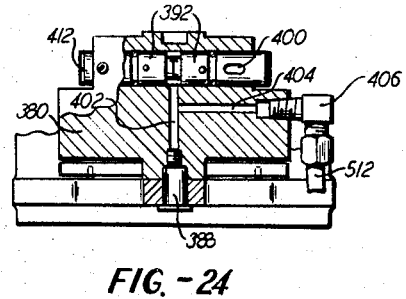
Figure 25:
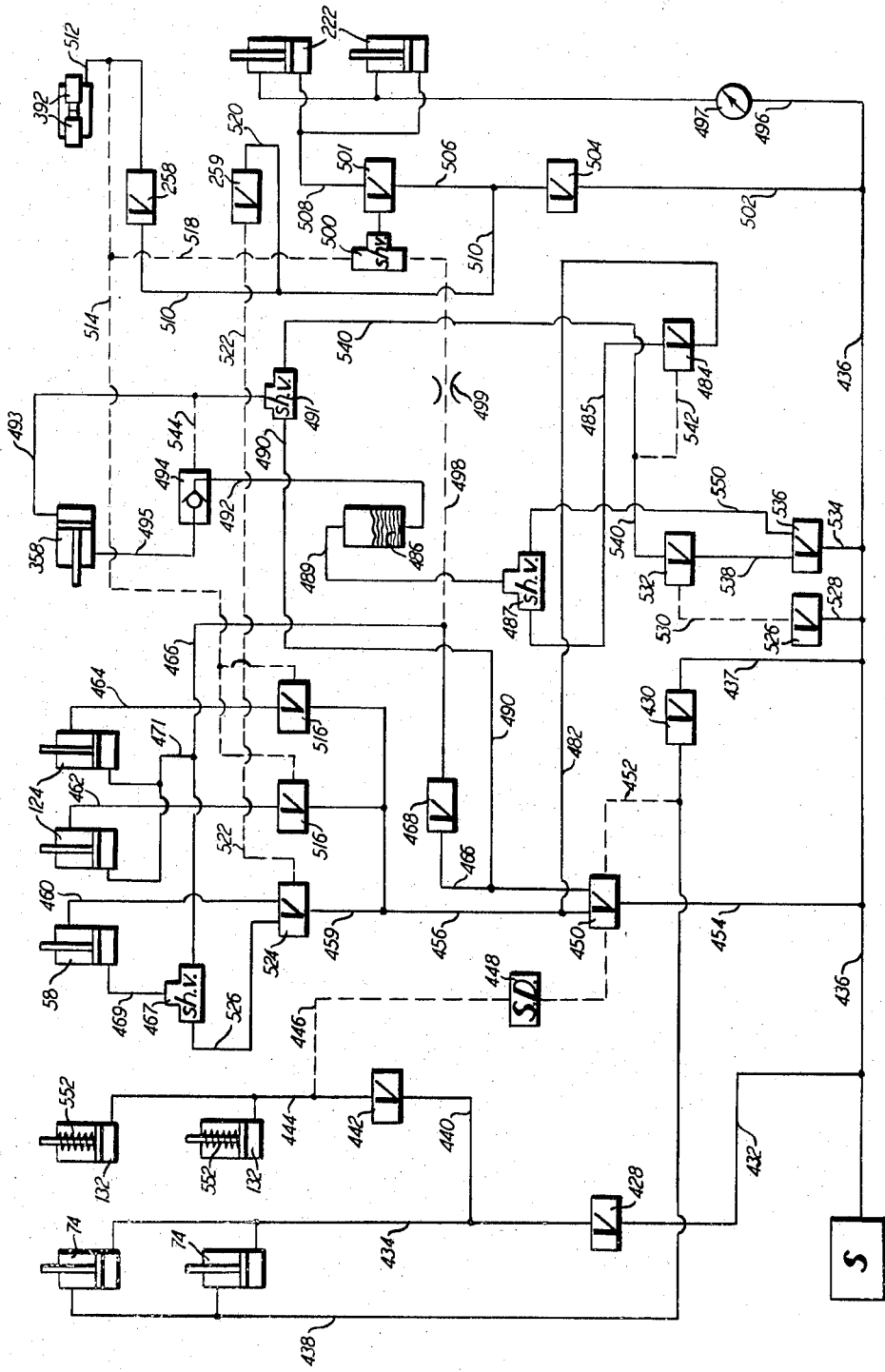
Figure 27A:
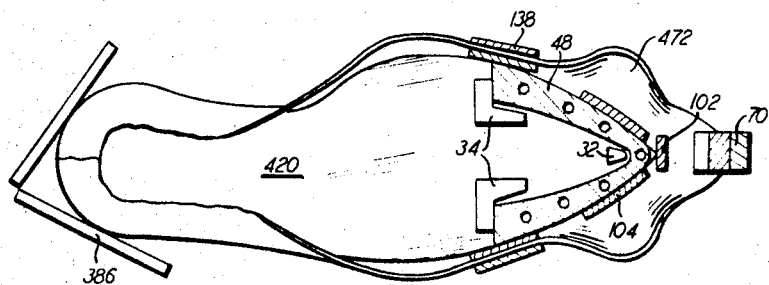
Figure 28:
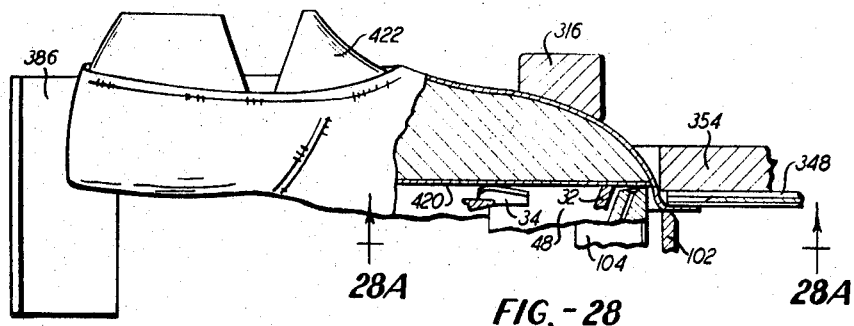
Figure 28A:
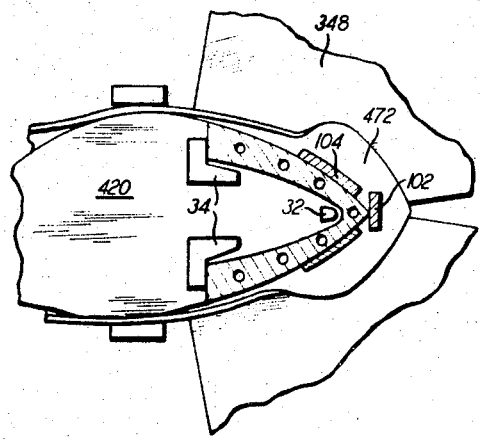

In the drawings:

FIGURE 1 is a side elevation of the machine;
FIGURE 2 is a front elevation of the upper portion of the machine;
FIGURE 3 is a vertical section of a portion of the machine that includes a toe post;
FIGURE 4 is a vertical section of an arrangement for supporting the last;
FIGURE 5 is an elevation, partly in section, of the front pincers and a front retarder;
FIGURE 6 is a view taken on the line 6—6 of FIGURE 5;
FIGURE 7 is a plan view of a portion of the machine showing the mounting of the side pincers;
FIGURE 8 is a section taken on the line 8—8 of FIGURE 7;
FIGURE 9 is a section taken on the line 9—9 of FIGURE 7;
FIGURE 10 is an elevation of a side pincers;
FIGURE 11 is a view taken on the line 11—11 of FIGURE 10;
FIGURE 12 is a plan view of a side pincers and a shifter mechanism;
FIGURE 13 is a view taken on the line 13—13 of FIGURE 12;
FIGURE 14 is a section of a handle;
FIGURE 15 is a view taken on the line 15—15 of FIGURE 12;
FIGURE 16 is a view taken on the line 16—16 of FIGURE 12;
FIGURE 17 is a side elevation, partially in section, showing heel clamp and wiper operating mechanisms;
FIGURE 18 is a view taken on the line 18—18 of FIGURE 17;
FIGURE 19 is a side elevation of the heel clamp and heel clamp holder;
FIGURE 20 is a view taken on the line 20—20 of FIGURE 19;
FIGURE 21 is a section taken on the line 21—21 of FIGURE 19;
FIGURE 22 is a section taken on the line 22—22 of FIGURE 20;
FIGURE 23 is a section taken on the line 23—23 of FIGURE 19;
FIGURE 24 is a view taken on the line 24—24 of FIGURE 23;
FIGURE 25 is a diagram of a part of the control circuit of the machine;
FIGURE 26 is a representation of a shoe assembly, that includes the last and upper, as it appears when it is placed in the machine;
FIGURE 26A is a view taken on the line 26A—26A of FIGURE 26;
FIGURE 26B is a view taken on the line 26B—26B of FIGURE 26A;
FIGURE 27 is a representation of the shoe assembly in the machine after the stretching operation has been completed;
FIGURE 27A is a view taken on the line 27A—27A of FIGURE 27;
FIGURE 28 is a representation of the shoe assembly in the machine just prior to the wiping of the stretched upper margin against an insole located on the last bottom; and
FIGURE 28A is a view taken on the line 28A—28A of FIGURE 28.

For the purpose of disclosing an illustrative embodiment of the invention, the machine disclosed in pending applications Ser. No. 472,525 filed July 16, 1965 and Ser. No. 549,026 filed May 10, 1966 have been modified to incorporate this invention.

Referring to FIGURES 1-3, the machine includes a frame 10 that incorporates a base plate 12 that has a sleeve 14 extending downwardly therefrom. For convenience of operation, the machine is inclined about 30 degrees from the horizontal. However, parts extending in the direction of the plate 12 will hereafter be referred to as extending horizontally and parts extending in the direction of the sleeve 14 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

An air operated motor 16 is secured to a cap 18 at the bottom of the sleeve 14, and a toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve. A toe post extension 28 (FIGURE 4) is secured to the upper end of the post 20. A bar 30, which serves as an insole rest mount, is secured to the post extension 28. A toe insole rest 32 and a pair of forepart insole rests 34 (see FIGURE 2) are mounted to the bar 30 with the forepart insole rests 34 located forwardly of and on opposite sides of the toe insole rest 32. A rearwardly extending ledge 36 of the post extension 30 has a hanger 38 depending therefrom. An air operated motor 40 is pivoted to the hanger 38. The piston rod 42 of the motor 40 is connected by a toggle linkage 44 to the post extension 28 and to a slide 46. The slide 46 is guided for vertical sliding movement by the post extension 28. The toggle linkage 44 is so constructed as to lower the slide 46 from the FIGURE 4 position in response to retraction of the piston rod 42 from the FIGURE 4 position into the motor 40. An applicator-support 48 is mounted to a mount 50 that is secured to the slide 46. The applicator-support 48 lies outwardly and rearwardly of the insole rests 32, 34 and has a configuration corresponding to the periphery of the toe portion of the insole of a shoe to be lasted.

Referring to FIGURES 5 and 6, a housing 52 is secured to and extends upwardly of the ledge 36. A bracket 54 is located rearwardly of and connected to the housing 52. An air operated motor 58 is secured to a block 60 that is secured to the bracket 54. The motor 58 has a piston rod 62 extending upwardly and forwardly thereof. A block 64 is secured to the piston rod 62 and a bar 66 is rigidly connected to the block 64. The bar 66 is slidably mounted in a guideway in the bracket 54. The upper jaw 68 of a front pincers 70 is secured to the upper end of the bar 66. The lower end of the bar 66 is secured to a bracket 72 on which a pair of air operated motors 74 are mounted. The piston rods 76 of the motors 74 are connected to a hanger 78, and a pin 80 is threaded into the hanger to extend upwardly thereof. The pin 80 is connected to a bar 82 that is slidable in ways formed in the bar 66. The lower jaw 84 of the pincers 70 is mounted to the upper end of the bar 82.

Above the ledge 36 the housing 52 is formed into a cylinder 86 in which a piston 88 is vertically movable. A piston rod 90, extending upwardly of the piston 88, is slidable in a bushing 92 that in turn is slidably mounted on the piston rod 90. A shoulder 94 is provided at the upper end of the bushing 92 and bears against the housing 52. A compression spring 96, interposed between the shoulder 94 and the piston 88, yieldably seats the shoulder against the housing bottom and yieldably urges the piston 88 downwardly against the force of the pressurized air that is normally in the cylinder 86. A bar 98, connected to and extending upwardly of the rod 90, is slidable in a vertical guideway 100 formed at the front end of the housing 52 above the cylinder 86, and a front retarder blade 102 is affixed to the top of the bar 98. The pincers 70 and the retarder blade 102 are both positioned rearwardly of the applicator-support 48 and the insole rests 32, 34.

Referring to FIGURE 2, a side retarder blade 104 is located outwardly of the applicator-support 48 and forwardly of the front retarder blade 102. Each retarder blade 104 is mounted in a column 106 for heightwise movement in a manner shown in the aforementioned applications Ser. No. 472,525 and Ser. No. 549,026.

Referring to FIGURES 7-9, a base 108 is secured to the toe post 20 below the toe post extension 28 (see FIGURE 4). The base 108 has a pair of slots 110 extending therethrough on opposite sides of the post 20. A block 112 is located below the base 108 straddling each slot 110. A pin 114 is mounted in each block 112 to extend through a slot 110. A sleeve 116, extending through each slot 110, embraces each pin 114 with the bottoms of the sleeves 116 lying on the blocks 112. A plate 118 is located above the base 108 to straddle each slot 110 on opposite sides of each pin 114 and sleeve 116. A cross-pin 120 extends through each associated plate 118, sleeve 116 and pin 114 to prevent relative movement of these members about the axes of the pins 114. A universal joint 122 is connected, as by welding, to the upper ends of each pin 114 and sleeve 116. An air actuated motor 124, which acts as a side pincers carrier, is connected to and extends upwardly of the top of each universal joint 122. A shaft 126, rotatably mounted in each plate 118, has an eccentric cam 128 mounted thereto.

Referring to FIGURES 10 and 11, the piston rod 130 of each motor 124 has a spring return air actuated motor 132 connected thereto that is slidably mounted in the motor 124. The inlet pipe 134 of each motor 132 rides in a slot 136 formed in the motors 124 to preclude rotation of the motors 132 with respect to the motors 124. A side pincers 138 is mounted in a bracket 140 that is affixed to the top of each motor 132. Each pincers 138 comprises an upper jaw 142 and a lower jaw 144, both jaws being swingable about a pin 146 mounted in the bracket 140. Elastic bands 148 extending about the jaws 142 and 144 serve to yieldably urge the jaws to open position. The jaws 142 and 144 respectively have downwardly extending legs 150 and 152 having rollers thereon that are positioned above a cone-shaped cam 154 formed at the top of the piston rod 156 of each motor 132.

Referring to FIGURES 2 and 12-16, a bracket 212 is attached to the outer side of each bock 112 by bolts 214. A tension spring 216 extends between a clip 218 secured to each bracket 212 and a clip 220 secured to each motor 124 to thereby yieldably urge the motors 124 outwardly on the universal joints 122 against the cams 128 with the bottoms of the motors bearing against the cams as indicated in FIGURE 8. An air actuated motor 222 is pivoted to each bracket 212 by a pivot pin 224. The upwardly extending piston rod 226 of each motor 222 is pivotally connected to a brake 228 having teeth 229 thereon. Each brake 228 is pivoted to its associated bracket 212 by a pivot pin 230. Each bracket 212 includes an upper shelf 232 having a boss 234 formed at its front. Each boss 234 rotatably receives a bar 236. The outer end of each bar 236 is secured by a pin 238 to an arm 240 and the inner end of each bar is secured by a key 242 (FIGURE 16) to an upwardly extending link 244.

The back of each arm 240 is formed into an arcuate toothed segment 246 that is adapted to mesh with the teeth 229 on the brake 228. A hollow handle 248 is secured to each arm 240. Each handle extends upwardly of its associated arm 240 and is bent at its mid-portion 249 so that the handle tops are inclined rearwardly. A rod 250 is located within the bottom of each handle 248 and a rod 252 is located within the top of each handle 248. A plurality of balls 254 are located within the mid-portion 249 of each handle 248. The rods 252 have buttons 256 that extends upwardly of the handles 248. Identical valves 258 and 259 are secured to the arms 240, the valve 258 being secured to the right arm 240 as seen in FIGURE 2 and the valve 259 being secured to the left arm 240 as seen in FIGURE 2. Each of the valves 258 and 259 has a valve stem 260 that extends into each handle 248 and is urged upwardly into each handle 248 by means of the conventional spring in the valve. Each valve stem 260 is in alignment with a projection 262 at the bottom of its associated rod 250. Compression springs 264, interposed between the rods 250 and the valves 258 and 259, yieldably urge the rods 250, the balls 254 and the rods 252 upwardly in unision to upper positions wherein the projections 262 do not depress the valve stems 260 downwardly into the valves 258 and 259.

The top of each link 244 is connected by a universal joint 266 to a rearwardly directed link 268. The back of each link 268 is pivoted to a sleeve 270. Each sleeve 270 rotatably receives a ring 272 that is secured to its associated motor 124.

A nut 274, threaded into each handle 248, has a circumferential groove 276. A lever 278 is pivoted to a finger 280 that extends upwardly of each arm 240. The outer end of each lever 278 is formed into a clevis 282 having inwardly directed pins 284 pivoted thereto that are slidably received in the groove 276. The inner end of each lever 278 is pivoted to the top of a rod 286 that extends downwardly through the middle of a forwardly-rearwardly extending slot 288 in its associated shelf 232. The lower portion of each rod 286 is formed into a rod extension 290 of smaller diameter than the upper portion of the rod. A stop shoulder 292, formed on each rod 286, defines the top of each rod extension 290. A compression spring 294 is coiled about each rod extension 290. The tops and bottoms of each spring 294 respectively bear against washers 296 and 298 that are slidably mounted on the rod extensions 290. The washers 296, which are of larger diameters than the slots 288, bear against the shoulders 292 and against the bottoms of the shelves 232. The washers 298 bear against nuts 300 that are threaded onto the bottoms of the rod extensions 290.

Referring to FIGURES 2, 17 and 18, a slide plate 302 is slidably mounted for forward-rearward movement, rearwardly of the insole rests 32, 34, the applicator-support 48, the pincers 70, 138 and the retarders 102, 104, in a head 304, that forms a part of the frame 10, on gibs 306. A motor 308 is connected to the slide plate 302 by means shown in the aforementioned patent applications Ser. Nos. 472,525 and 549,026 to effect forward-rearward movement of the silde plate. Trunnions 310 upstanding from the slide plate 302 mount a pin 312 on which is swingably mounted the mid-portion of a hold-down lever 314 that extends forwardly and rearwardly of the pin 312. A toe hold-down 316 is secured to the front end of the lever 314. An air actuated motor 318, pivoted to a bracket 320 secured to the frame 10, has a piston rod 322 that is pivoted to the rear of the lever 314.

An air actuated motor 324 is secured to a flange 326 secured to the rear of the slide plate 302. The piston rod 328 of the motor 324 is connected to a housing 330 that is slidably mounted in gibs 332 formed in the slide plate 302. A block 334 is slidably mounted in the gibs 332 forwardly of the housing 330 and is connected to the housing by a bolt 336. A pair of symmetrically disposed wiper cams 338 are slidably supported on a thickened block 340 that forms the forward end of the slide plate 302. The block 340 has pins 342 upstanding therefrom that extend into slots or cam tracks 344 and 346 formed in the wiper cams 338. Forwardly divergent links 347 are pivotally connected at their rear ends to the block 334 and at their forward ends to the wiper cams 338. Wipers 348 are connected to and extend forwardly of the wiper cams 338. The wipers are flat plates having forwardly divergent edges 350 that diverge forwardly from a vertex 352.

As shown in FIGURE 2, a U-shaped shoe conforming yoke 354 is mounted to a cover block 356 that is secured to the block 340, the yoke 354 being located above the wipers 348.

Referring to FIGURES 1, 2 and 17, a fluid actuated motor 358 is secured to a hanger 360 depending from the head 304. The piston rod 362 of the motor 358 is connected by way of a plate 364 to a pair of bars 366 that are slidably guided in bosses 368 and 370 affixed to the frame 10. A yoke 372 is secured to and straddles the front ends of the bars 366. A post 374 is adjustably mounted to the yoke 372 for heightwise movement.

Referring to FIGURES 19-24, a carrier 376 is mounted to a mount 378 that is secured to the top of the post 374. A heel clamp holder 380 is pivotally mounted to the carrier 376 for swinging movement about a horizontal axis by a pin 382. A bolt 384, threaded into the carrier 376 and rotatably mounted in the holder 380, can be manipulated to swing the holder about the axis of the pin 382 to thereby adjust the inclination of the holder 380 with respect to the carrier 376. A heel clamp 386 is mounted to the holder 380 for swinging movement about a heightwise axis by means of pivot pins 388. The heel clamp has two rearwardly divergent members 390 secured thereto and a clamp pad 391 is attached to each member 390. The heightwise axis formed by the pins 388 is located forwardly of the clamp pads 391. A pair of aligned locking members, that take the form of plungers 392, are slidably mounted in the holder 380 for inward-outward movement. Pins 398, mounted in the holder 380, extend into slots 400 in the plungers 392 to limit the extent of inward and outward movement of the plungers in the holder. A tension spring 394 extends between the plungers 392. Each end of the spring 394 is attached to a pin 396 that is mounted to a plunger 392 to thereby enable the spring to yieldably urge the plungers to a central position where they are in abutting relation. The abutting faces of the plungers 392 are of reduced diameter and lie above a passage 402 in the holder 380 to enable flow of presurized air through the passage 402, as described below, to move the plungers outwardly against the force of the spring 394. The passage 402 is in communication with a passage 404 in the holder 380 and the passage 404 is in communication wih a fitting 406 that is attached to the holder. Wings 408, secured to the members 390, lie outwardly of the plungers 392. The outer faces of the plungers 392 are provided with teeth 410 that are engageable with teeth 412 formed on the wings 408. A rod 414 is rotatably mounted in a boss 416 of the holder 380 and extends outwardly of the boss. Left and right hand threads are formed on the rod 414 on opposite sides of the boss 416, and each thread is screwed into a lug 418 that is slidably mounted in the holder 380 for inward-outward movement. The lugs are in registration with the backs of the members 390 to thereby limit the extent that the heel clamp 386 may swing about the axes of the pins 388.

In the idle condition of the machine: the motor 16 and the insole rests 32, 34 carried thereby are in a lowered position; the motor 40 is in the FIGURE 4 position so that the applicator-support 48 is in the upper position shown in FIGURE 4; the front pincers 70 is in a raised position with the jaw 68 in its uppermost position due to the projection of the piston rod 62 upwardly of the motor 58 and the retraction of the piston rods 76 into the motors 74; pressurized air is entering the cylinder 86 to raise the piston rod 90 and the front retarder 102 with respect to the housing 52 against the resistance of the spring 96; the side retarders 104 are yieldably held in raised positions; the motors 124 are held in outward positions against the cams 128 by the springs 216 and are held by gravity in a forward position with the washers 296 bearing against the bottoms of the shelves 232 due to the inclination from the vertical of the motors 124 and the side pincers 138 carried thereby (FIGURE 1); the piston rods 130 of the motors 124 are in an elevated position and the motors 132 are in a lowered position with respect to the piston rods 130 so that the side pincers 138 are in raised positions with their jaws open; the piston rods 226 are retracted into the motors 222 so that the brakes 228 are disengaged from the arms 240; the slide plate 302 and the parts carried thereby are caused by the motor 308 to be in a rearward out-of-the-way position; the piston rod 322 is retracted into the motor 318 so that the hold-down 316 is in an elevated position; the piston rod 328 is retracted into the motor 324 so that the wipers 348 are in their retracted open position; the piston rod 362 is projected out of the motor 358 so that the heel clamp 386 is in a forward position; and there is no pressurized air in the passages 402 and 404 so that the pistons 392 are in abutting relation and are disengaged from the wings 408.

Referring to FIGURES 26, 26A and 26B, a shoe assembly is presented bottom-down to the machine to be pulled over and toe lasted The shoe assembly comprises a shoe insole 420 located on the bottom of a last 422, as by being tacked thereto, and a shoe upper 424 draped over the forepart of the last. The shoe has preferably been heel seat lasted prior to presentation to the machine. The insole is brought to bear against the top of the applicator-support 48, which at this time is resiliently urged above the level of the insole rests 32, 34 by springs 426 (FIGURE 4) in the mount 50, so that the applicator-support bears against and supports the margin of the toe portion of the insole. The outer periphery of the last is caused to bear against the front retarder 102 and the side retarders 104 so that the retarders act as gauges to locate the shoe assembly in the machine. The toe end of the upper margin is placed between the open jaws of the front pincers 70 and the forepart portions of the upper margin are inserted between the open jaws of the side pincers 138.

FIGURE 25 shows a simplified schematic representation of a portion of the control circuit of the machine with the source of air for the central system designated as S, the pressure lines drawn in solid lines and the pilot lines drawn in dashed lines.

Referring to FIGURE 25, at this time a valve 428 is shifted into open position from its normally closed position and a valve 430 is shifted into closed position from its normally open position. The opening of the valve 428 caused pressurized air to pass from the source S through a line 432, the valve 428 and a line 434 to the motors 74 to actuate these motors to close the jaws of the front pincers 70 on the toe end portion of the upper margin. In the idle condition of the machine, pressurized air had entered the motors 74 to maintain the pincers 70 open from the source S through a line 436, a line 437, the valve 430 and a line 438. During the actuation of the motors 74 to close the jaws of the pincers 70, the air above the pistons of these motors egresses therefrom through the line 438 and the valve 430 and is exhausted to atmosphere from the valve 430.

The opening of the valve 428 also causes air to pass through this valve and a line 440 to a normally closed valve 442.

Now the valve 442 is opened, while the valve 428 remains open, to enable pressurized air to pass from the line 440 through the valve 442 and a line 444 to the motors 132 to actuate these motors to raise the cams 154 to close the jaws 142 and 144 of the side pincers 138 and thereby cause the side pincers 138 to grip the forepart portions of the upper margin. At the same time, pressurized air passes from the line 442 and a pilot line 446 to a sequencing device 448 to shift a valve 450 after the actuation of the motors 132. The sequencing device 448 is a conventional item so constructed as to offer resistance to the passage of air therethrough so that the air will follow an alternative path other than through the sequencing device if one is available. When such an alternative path is not available or is blocked, the air will go through the sequencing device. The valve 450 had been maintained in its initial position by pressurized air passing from the valve 430 through a pilot line 452 to the valve 450. The closure of the valve 430 had allowed the air in the line 452 to be exhausted to atmosphere through this valve. The shifting of the valve 450 enables pressurized air to pass from the line 436 through a line 454, the valve 450, a line 456 and lines 459 and 460 to the motor 58 and lines 462 and 464 to the motors 124 to actuate these motors. Prior to the shifting of the valve 450, the motor 58 had been maintained in its idle condition by pressureized air passing to this motor from the valve 450 through a line 466, a shuttle valve 467 and a line 469. Prior to the shifting of the valve 450, the motors 124 had been maintained in their idle conditions by pressurized air passing to these motors from the valve 450 through the line 466 and a line 471. The air egressing from the motors 58 and 124 in response to the shifting of the valve 450 is vented to atmosphere through the line 466 and a quick exhaust valve 468 in the line 466. The actuation of the motor 58 causes the front pincers 70 to move downwardly and rearwardly away from the last to thereby stretch the toe portion of the upper margin about the toe end of the last and the actuation of the motors 124 causes these motors to move the side pincers 138 downwardly to stretch the forepart portions of the upper margin about the last.

The aforesaid downward and rearward movement of the front pincers 70 causes the upper 424 to be pulled and stretched about the toe end of the last and also in a heel to toe direction with the upper dragging about the front retarder 102. The downward movement of the side pincers 138 causes the upper at the forepart to be stretched tightly about the last 422 with the upper dragging about the side retarders 104. The universal joints 122 enable the motors 124 and the side pincers 138 carried thereby to swing rearwardly towards the toe of the shoe assembly and inwardly of the shoe assembly during the downward movement of the side pincers. Due to the inclination from the vertical of the motors 124 as shown in FIGURE 1, these motors and the side pincers are normally tilted from the vertical to a position where the washers 296 engage the shelves 232 (FIGURE 15) at an inclination determined by the manipulation of the nuts 274. The washers 296 move downwardly of the shelves 232 during the toeward movement of the motors 124 and the side pincers 138. The bases of the motors 124 ride off the cams 128 during the inward movements of the motors 124 and the side pincers 138. These toeward and inward movements are occasioned by the direction of pull of the front pincers 70, and the mounting of the side pincers 138 that permits their toeward and inward movement prevents the side pincers from fighting against the front pincers during their upper stretching movements. The result of the aforesaid pincers movements is a tight stretching of the upper about the toe and forepart of the last with the topline 470 (FIGURE 27) of the upper stretched tightly on the last. During the movements of the pincers 70 and 138, the toe end portion of the upper 424 is forced about the front retarder 102 (FIGURE 27) and forces the front retarder down to some extent against the yieldable force provided by the pressurized air in the cylinder 86, and the forepart portions of the upper are forced about the side retarders 192 and force the side retarders down to some extent against the yieldable forces urging them upwardly. The front retarder 102, by engaging the toe end of the last, prevents rearward or toeward movement of the shoe assembly during the stretching movement of the front pincers 70, and the side retarders 104, by engaging the sides of the last, prevent lateral movement of the shoe assembly during the stretching movement of the side pincers 138. Since the front pincers 70 and the side pincers 138 are driven in their stretching movements by yieldable forces created by air under pressure, they terminate these movements when the stretching forces are equalized by the resistance to stretching of the upper. The portions of the stretched upper margin between the front and side pincers are outspread into dog ears 472 (FIGURE 27A).

As stated above, when the shoe assembly was placed in the machine, the applicator-support 48 was resiliently urged above the level of the insole rests 32, 34 by the springs 426, this causing the insole 420 to be located above the insole rests. The downward pulling action of the pincers 70 and 138 causes the applicator-support to move downwardly against the forces of the springs 426 until the insole 420 comes into engagement with the insole rests 32, 34. At the end of the downward movement of the applicator-support, the insole is therefore supported at its margin by the applicator support 48, which prevents the insole margin from drooping downwardly of the last, and is supported interiorly of its margin by the insole rests 32, 34.

The aforementioned shifting of the valve 450 had also enabled pressurized air to pass from the line 456 through a line 482, a valve 484, a line 485, a shuttle valve 487 and a line 489 to the top of an air-oil tank 486 as seen in FIGURE 25. The air-oil tank 486 is a conventional item that includes a compartment having incompressible oil at its bottom in communication with an oil line 492. The motor 358 is maintained in its idle condition by pressurized air passing from the valve 450 through a line 490, a shuttle valve 491 and a line 493 to this motor. The air in the line 490 is cut off when the valve 450 is shifted. The admission of pressurized air to the top of the tank 486 causes the oil in the bottom of the tank to be forced through the oil line 492, a check valve 494 and a line 495 to the motor 358 to thereby cause the motor 358 to move the heel clamp 386 rearwardly until it engages the heel of the shoe assembly as indicated in FIGURES 27 and 27A. In moving against the heel of the shoe assembly, the heel clamp 386 swings about the axis of the pins 388 until both clamp pads 391 are tangential to the sides of the shoe assembly, the extent and direction of swinging of the heel clamp being dependent on the size and style of the shoe assembly and on whether the shoe assembly is of a left or right foot.

The motors 222 are maintained in their idle position by air passing to these motors at a relatively low pressure from the line 436 through a line 496 and a low pressure regulator 497. In the idle condition of the machine, pressurized air passes from the line 466 through a pilot line 498, a restrictor valve 499 and a shuttle valve 500 to a spring return valve 501 to shift the valve 501 to closed position. The aforementioned shifting of the valve 450 had cut off the flow of air through the pilot line 498 to the valve 501 thereby enabling the valve 501 to open due to the air in the line 498 venting to atmosphere through the quick exhaust valve 468.

The opening of the valve 501 enables air at full line pressure to pass from the line 436 through a line 502, a valve 504, a line 506, the valve 501 and a line 508 to the motors 222 to overcome the low pressure air in the line 496 and actuate the motors 222 to bring the teeth 229 into locking engagement with the toothed segments 246 and thus lock the handles 248 against movement and the side pincers 138 against forward-rearward movement. The restrictor valve 499 delays the flow of air from the line 498 to atmosphere through the quick exhaust valve 408 for a sufficient time as to enable the pincers 70 and 138 to complete their downward stretching of the upper margin with the accompanying toeward movement of the side pincers 138 together with the motors 124, the handles 248 and the arms 240 before the handles 248 are locked against movement.

The operator may, at this time, if the upper is not properly located in the last, depress both buttons 256 (FIGURE 2) to shift the valves 258 and 259. This enables the side pincers 138 to be individually shifted in forward-rearward directions along the last in the manner described below.

The shifting of the valve 258 enables pressurized air to pass from the line 506 through a line 510, the valve 258 a line 512, the fitting 406 (FIGURE 24) and the passages 404 and 402 to the plungers 392 to force the plungers 392 outwardly against the force of the spring 394 to thereby cause the teeth 410 and 412 to mesh so as to lock the heel clamp 386 in the position it had assumed when it had swung about the exis of the pins 388 pursuant to the engagement of the heel clamp with the heel portion of the shoe assembly.

The shifting of the valve 258 also enables pressurized air to pass from the line 512 through a pilot line 514 to normally open valves 516 that are interposed in the lines 462 and 464 to thereby close the valves 516. The closure of the valves 516 shuts off the flow of pressurized air to the motors 124 through the lines 462 and 464 so as to stop the application of the downwardly directed force applied by the side pincers 138 to the forepart portions of the upper margin.

The shifting of the valve 258 also enables pressurized air to pass from the pilot line 514 through a pilot line 518 and the shuttle valve 500 to the valve 501 to again close the valve 501 thereby enabling the motors 222 to disengage the teeth 229 from the toothed segments 246.

The shifting of the valve 259 enables pressurized air to pass from the line 510 through a line 520, the valve 259 and a pilot line 522 to a spring return valve 524 interposed between the lines 459 and 460 to shift the valve 524. Prior to this shifting of the valve 524, this valve had been in such position as to enable air to flow from the line 459 through the valve 524 and the line 460 to the motor 58. The shifting of the valve 524 enables pressurized air to pass from the line 459 through the valve 524, a line 526, the shuttle valve 467 and the line 469 to the motor 58 to actuate this motor to raise the front pincers 70 and the toe end portion of the upper margin gripped thereby.

At this time, with both buttons 256 still depressed, the operator may move either or both handles 248 forwardly or rearwardly about the axes of the bars 236. A forward and rearward movement of a handle 248, through the connection afforded by the members 244, 266, 268, 270 and 272 will respectively cause the associated motor 124 and the side pincers 138 to move forwardly and rearwardly about the universal joints 122 to thereby cause the forepart upper margin portions gripped by the side pincers 138 to shift forwardly or rearwardly to a desired new position as determined by the operator. The locking of the heel clamp 386 at this time by the teeth 410 and 412 enables the heel clamp, by virtue of its pressing against the heel portion of the shoe assembly as shown in FIGURES 27 and 27A, to prevent the rearward or forward shifting of the side pincers from twisting the shoe assembly in a horizontal plane on the support constituted by insole rests 32, 34 and the applicator-support 48. The release at this time of the downwardly directed force applied by the side pincers 138 to the upper margin prevents the forepart portions of the upper margin gripped by the side pincers 138 from dragging unduly about the last periphery during the shifting of the side pincers to their new positions. The disengagement of the teeth 229 from the toothed segments 246 at this time unlocks the arms 240 and the handles 248 so that the shifting of the side pincers 138 can take place. The raising of the front pincers 70 at this time raises the toe end portion of the upper margin gripped by the front pincers so as to provide sufficient slack between the upper and the last as to enable the shifting of the side pincers 138 to take place without contending with the tension and stretching that had been imparted to the upper by the original downward movement of the front pincers.

A forward movement of a handle 248 causes its associated rod extension 290 to move downwardly of its associated shelf 232. A rearward movement of a handle 248 causes its associated rod extension 290 to move upwardly of its associated shelf 232 with a compression of the associated spring 294.

After the forepart portions of the upper margin gripped by the side pincers 138 have been shifted in forward-rearward directions to the operator's satisfaction, the buttons 256 are released to enable the valves 258 and 259 to shift back to their original positions. This causes the heel clamp 386 to be unlocked so that it is again free to swing about the axes of the pins 388, causes the front pincers 70 and the side pincers 138 to again be forced downwardly to stretch the upper about the toe and forepart of the last, and enables the motors 222 to again cause the teeth 229 to lock against the toothed segments 246 to thereby lock the handles 248 and the side pincers 138 to the positions to which they had been shifted. The operator can now release the handles 248.

The operator may, because of the nature of the upper material being worked on, choose to depress only the right button 256 and thus not raise the front pincers 70 during the shifting of the side pincers 138.

Now the operator causes a valve 526 to be shifted while the valve 428, 430 and 442 remain in shifted condition. This causes air to pass from the line 436 through a line 528, the valve 526 and a pilot line 530 to a valve 532 to shift the valve 532. The shifting of the valve 532 enables air to pass from the line 436 through a line 534, a valve 536, a line 538, the valve 532, a line 540 and a pilot line 542 to the valve 484 to shift the valve 484 to closed position and thereby cut off the flow of pressurized air to the top of the air-oil tank 486. The shifting of the valve 532 also causes pressurized air to pass from the line 540 through the shuttle valve 491 and the line 493 to the motor 358 and to pass from the line 493 through a pilot line 544 to the check valve 494 to open the check valve 494. Therefore the shifting of the valve 526 causes pressurized air in the line 493 to cause the motor 358 to move the heel clamp 386 away from the shoe assembly to its idle position with the oil in the motor 358 returning to the tank 486 through the line 495, the now open check valve 494 and the line 492.

The shifting of the valve 526, by means not shown, also actuates the motor 308 to move the slide plate 302 forwardly from its rearward out-of-the-way position to a forward working position where the parts carried by the slide plate assume the position indicated in phantom in FIGURE 27. When the slide plate 302 has completed its forward movement, the motor 16 is actuated to raise the post 20 together with the applicator-support 48, the insole rests 32, 34, the pincers 70 and 138, and the retarders 102, 104 to a level such that the bottom of the insole 420 is above the level of the tops of the wipers 348 an amount that is approximately equal to the thickness of the margin of the upper 424. At about the beginning of the rise of the applicator-support 48, a quantity of cement is extruded through holes 546 and a groove 548 (FIGURES 4 and 27) in the applicator-support 48 against the bottom of the margin of the insole 420. Shortly after the shoe assembly has commenced its rise, air under relatively low pressure is admitted to the motor 318 to actuate this motor to force the hold-down 316 against the top of the rising shoe under relatively low pressure. The hold-down 316 rides upwardly with the shoe assembly under this relatively low pressure during the rise of the shoe assembly.

The shoe assembly was initially so placed on the applicator-support 48 that when the yoke 354 was moved to its forward working position the edges of the last 422 overlapped the inner wall of the yoke. When the shoe assembly is forced upwardly by the motor 16, the yoke 354 snugly engages the upper 424 and constrains the upper to snugly conform to the shape of the last 422.

The parts are so constructed that the raising of the side retarder blades 104 during the rise of the post 20 causes the side retarders to press the dog ears 472 against the bottoms of the wipers 348 under relatively light pressure and the raising of the front retarder blade 102 during the rise of the post 20 causes the front retarder to press the portion of the upper stretched by the front pincers 70 against the bottoms of the wipers 348 immediately to the rear of the vertex 352 of the wipers under the force exerted by the pressurized air in the cylinder 86. During the final increment of the rising movement of the toe post 20, after the retarders 102 and 104 have pressed the upper margin against the wiper bottoms, the upper is stretched further about the last, and when the upper can no longer be stretched, the pressed margin portions slip between the wiper bottoms and the retarders.

At or near the end of the rise of the toe post 20 and at or near the time that the front retarder 102 has forced the upper margin against the wiper bottoms, the motors 74 are actuated to open the front pincers 70 to release the toe end portion of the upper margin and the pincers 70 can now be moved downwardly and rearwardly to its lowermost position by the motor 58. This arrangement permits the front pincers to be lowered before it can interfere with the wipers and enables the front retarder 102 to engage the upper margin without losing any of the stretch in the upper that had been provided by the front pincers 70. At about the same time, the valve 536 is shifted (by means not shown) to cut off the flow of pressurized air through the lines 538 and 540 and enable pressurized air to flow from the valve 536 through a line 550, the shuttle valve 487 and the line 489 to the air-oil tank 486 to thereby again actuate the motor 358 to move the heel clamp 386 against the heel portion of the shoe assembly. After this the flow of pressurized air to the motors 132 is cut off and the air in these motors is exhausted to atmosphere to thereby enable the springs 552 (FIGURES 11 and 25) of these motors to lower the piston rods 156 so that the jaws of the side pincers 138 may open under the influence of the elastic bands 148 and thus release the forepart portions of the upper margin that had been gripped by the pincers 138. After the pincers 138 release the upper margin, they are lowered by further downward movement of the piston rods 130 of the motors 124.

At this time the parts assume the position shown in FIGURES 28 and 28A.

Now the motor 324 is actuated to move the wipers 348 in their wiping stroke. The actuation of the motor 324, through the housing 330, the block 334 and the links 347 causes the wiper cams 338 and the wipers 348 carried thereby to move with respect to the block 340 with the pins 342 riding in the cam tracks 344 and 346 in a path determined by the configuration of the cam tracks such that the wipers have both inward swinging movement about the vertex 352 and forward translatory movement. The wiper movement causes the wipers to engage the upper margin while the upper is stretched about the last to wipe or fold the upper margin against the insole 420 and bond the upper margin to the insole by means of the ribbon of cement on the insole.

As the wipers perform their wiping stroke, the motor 40 is actuated to cause the lowering of the applicator-support 48 out of the path of the wipers, the application of pressure by the side retarders 104 against the wiper bottoms is terminated, the flow of pressurized air to the cylinder 86 is cut off so that the spring 96 can lower the retarder 102 away from the wiper bottoms and the motor 16 is actuated to lower the post 20 and thus lower the insole rests, 32, 34 out of the path of the wipers. Towards the end of the wiper stroke air under full line pressure is admitted to the motor 318 to actuate this motor to force the hold-down 316 downwardly against the forepart of the shoe assembly under greater pressure than had heretofore been applied.

Thus, during the wiping stroke, the applicator-support 48 is first lowered out of the path of the oncoming wipers. After this, the pressures applied by the front retarder 102 and the side retarders 104 forcing the upper margin against the wiper bottoms is relieved, the timing being such that this takes place after the wipers have crossed under the insole and have started to wipe the upper margin against the insole. This is followed by the lowering of the insole rests 32, 34 out of the path of the oncoming wipers so that the shoe assembly is supported on its bottom solely by the wipers thus enabling the hold-down 316 to press the shoe assembly downwardly directly against the wipers and provide an overwiping pressure. Toward the end of the wiping stroke the hold-down is forced downwardly under relatively heavy pressure for a predetermined length of time to iron the now wiped upper margin against the insole and to enable the cement that is between the wiped upper margin and the insole to bond the upper margin to the insole. At the end of this predetermined length of time, the valves 428, 430, 442 and 526 are shifted to their original positions so that all of the machine parts can return to their idle conditions to complete the machine cycle.

We claim:

1. A pulling over mechanism for stretching the toe and forepart portions of an upper about the corresponding portions of a last, preparatory to wiping the margins of said upper portions against an insole located on the last bottom, comprising: a frame; a support for supporting bottom-down a shoe assembly that includes the last having the upper draped thereon with the toe end of said assembly facing rearwardly and the heel end of said assembly facing forwardly; a side pincers carrier located on each side of the support; a side pincers mounted to each side pincers carrier for heightwise movement; means mounting each side pincers carrier to the frame for forward-rearward movement; an arm associated with each side pincers carrier; means movably mounting each arm to the frame; a connection between each arm and its associated side pincers carrier so constructed that forward movement of each side pincers carrier causes movement of its associated arm in a first direction and rearward movement of each side pincers carrier causes movement of its associated arm in a second direction; a brake associated with each arm; means mounting each brake to the frame for movement between an open position wherein it is spaced from its associated arm and a braking position wherein it is in engagement with its associated arm to lock its associated arm against movement and thereby lock its associated side pincers against forward-rearward movement; means for initially constraining each side pincers carrier to a prescribed location in a forward-rearward direction; means for initially maintaining each side pincers in an upper position with respect to its associated pincers carrier; means for causing each side pincers to grip a forepart portion of the upper margin; means for thereafter applying a force such as to urge each side pincers downwardly with respect to its associated pincers carrier to thereby stretch the upper about the last; means operative at the completion of the stretching operation to maintain the brakes in their braking positions; a manually operable control means operatively connected to the brakes; means responsive to actuation of the control means to cause the brakes to move to their open positions so that the pincers carriers together with the gripped upper forepart portions may be shifted in forward-rearward directions with a concomitant movement of the arms; and means responsive to deactuation of the control means to cause the brakes to move to their braking positons to thereby lock the pincers carriers together with the gripped upper forepart portions in their shifted positions.

2. The mechanism as defined in claim 1 further comprising: a front pincers, mounted for heightwise movement, located rearwardly of the support; means for initially maintaining the front pincers in an upper position; means for initially maintaining the brakes in their open positions; means for causing the front pincers to grip the toe end portion of the upper margin; means for thereafter, and concomitantly with said application of said forces to said side pincers, applying a downwardly directed force to said front pincers to enable the front pincers to partake in the stretching of the upper about the last and to enable the side pincers and the margin portions gripped thereby to move rearwardly from said prescribed positions pursuant to the forces exerted during said stretching operation; and means operative after the completion of the stretching operation to move the brakes from their open positions to their braking positions.

3. The mechanism as defined in claim 2 further comprising: a second manually operable control means; means responsive to actuation of said second control means to raise the front pincers to said upper position; and means responsive to deactuation of said second control means to reapply said force to the front pincers.

4. The machine as defined in claim 1 further comprising: means responsive to the actuation of the control means to relieve the application of said forces to the side pincers; and means responsive to the deactuation of the control means to reapply said forces to the side pincers.

5. The mechanism as defined in claim 1 further comprising: a front pincers, mounted for heightwise movement, located rearwardly of the support; means for initially maintaining the front pincers in an upper position; means for causing the front pincers to grip the toe end portion of the upper margin; means for thereafter, and concomitantly with said application of said forces to said pincers, applying a downwardly directed force to said front pincers to enable the front pincers to partake in the stretching of the upper about the last; a second manually operable control means; means responsive to actuation of said second control means to raise the front pincers to said upper position; and means responsive to deactuation of said second control means to reapply said force to the front pincers.

6. The mechanism as defined in claim 1 further comprising: a heel clamp holder, located forwardly of the support, mounted for forward-rearward movement; a heel clamp, having a pair of rearwardly divergent clamping members, mounted to the holder for swinging movement about a heightwise extending axis; locking means operable when actuated to lock the heel clamp against movement about said axis and operable when deactuated to release the heel clamp for movement about said axis; means for initially maintaining the heel clamp holder together with the heel clamp in a forward position wherein the heel clamp is remote from the shoe assembly; means for initially maintaining the locking means in a deactuated condition; means to move the heel clamp holder together with the heel clamp so as to cause the heel clamp to bear against the heel portion of the shoe assembly when the stretching operation has been completed; means responsive to the actuation of said control means to actuate the locking means; and means responsive to deactuation of the control means to deactuate the locking means.

7. The mechanism as defined in claim 6 further comprising: a pair of plungers mounted to the heel clamp holder for inward-outward movement; a wing on the heel clamp located outwardly of each plunger; said plungers and wings serving as said locking means with the locking means being in deactuated condition when the plungers are in inner positions disengaged from the wings and the locking means being in actuated condition when the plungers are in outer positions in engagement with the wings; means for initially maintaining the plungers in said inner positions; means responsive to actuation of the control means to cause the plungers to move to said outer positions; and means responsive to deactuation of the control means to cause the plungers to return to their inner positions.

8. The mechanism as defined in claim 1 further comprising: a shelf, that forms a part of the frame, located on each side of the support; pivot means mounting each arm to a shelf for swinging movement about an axis that is transverse to the directions of said forward-rearward movement, said pivot means serving as the means movably mounting the arms to the frame; a handle secured to and extending upwardly of each arm; and a linkage extending between each pivot means and its associated side pincers carrier, said linkages serving as said connections between the arms and their associated side pincers carriers.

9. The mechanism as defined in claim 8 further comprising: a button movably mounted to one of said handles; means responsive to a depression of the button to actuate said control means; and means responsive to a release of said button to deactuate said control means.

10. The mechanism as defined in claim 5 further comprising: a shelf, that forms a part of the frame, located on each side of the support, pivot means mounting each arm to a shelf for swinging movement about an axis that is transverse to the directions of said forward-rearward movement, said pivot means serving as the means movably mounting the arms to the frame; a handle secured to and extending upwardly of each arm; and a linkage extending between each pivot means and its associated side pincers carrier, said linkages serving as said connections between the arms and their associated side pincers carriers.

11. The mechanism as defined in claim 10 further comprising: a first button movably mounted to one of said handles; means responsive to a depression of said first button to actuate the first mentioned control means;

means responsive to a release of said first button to deactuate the first mentioned control means; a second button movably mounted to the other of said handles; means responsive to a depression of said second button to actuate said second control means; and means responsive to a release of said second button to deactuate said second control means.

12. The mechanism as defined in claim 8 further comprising: a slot extending through each shelf; a rod connected to each handle and depending through its associated slot; a washer, of a larger diameter than the width of said slot, movably mounted on each rod below its associated shelf; a spring located below each washer for yieldably urging the washers upwardly on the rods; and a stop member on each rod limiting the extent of upward movement of the washers on the rods; whereby the engagement of the washers with the bottoms of the shelves determines said prescribed locations of the side pincers.

13. The mechanism as defined in claim 12 further comprising: means for adjusting the rods heightwise with respect to their associated handles to thereby adjust the positions of said prescribed locations.

14. The mechanism as defined in claim 13 wherein said means for adjusting the rods heightwise comprises: a finger secured to each handle; a lever pivoted intermediate its ends to each finger; a first pivotal connection between a first end of each lever and the top of its associated rod; a second pivotal connection between the second end of each lever and its associated handle; and means for adjusting the heightwise position of each of said second pivotal connections with respect to its associated handle.

15. A pulling over mechanism for stretching the toe and forepart portions of an upper about the corresponding portions of a last, preparatory to wiping the margins of said upper portions against an insole located on the last bottom, comprising: a frame; a support for supporting bottom-down a shoe assembly that includes the last having the upper draped thereon with the toe end of said assembly facing rearwardly and the heel end of said assembly facing forwardly; a side pincers carrier located on each side of the support; a side pincers mounted to each side pincers carrier for heightwise movement; means mounting each side pincers carrier to the frame for heightwise movement; means mounting each side pincers carrier to the frame for forward-rearward movement; means for effecting heightwise movement of each side pincers with respect to its associated pincers carrier; means enabling each side pincers to grip a forepart portion of the upper margin; a shelf, that forms a part of the frame, located on each side of the support, an arm located on each side of the support; pivot means mounting each arm to a shelf for swinging movement about an axis that is transverse to the direction of said forward-rearward movement; a brake associated with each arm; means mounting each brake to a shelf for movement between an open position wherein it is spaced from its associated arm and a braking position wherein it is in engagement with its associated arm to lock its associated arm against movement; a handle secured to and extending upwardly of each arm; a linkage extending between each pivot means and its associated side pincers carrier; and means for initially constraining each side pincers carrier to a prescribed location in a forward-rearward direction; whereby, after the side pincers have gripped the forepart portions of the upper margin and have moved downwardly with respect to the pincers carriers to stretch the upper about the last and the brakes have assumed an open position, the handles may be moved in forward-rearward directions to thereby, by means of the linkages, move the side pincers in forward-rearward directions to shift the gripped upper margin portions along the last, after which the brakes may be moved to their braking positions to maintain the gripped margin portions in their shifted positions.

16. The mechanism as defined in claim 15 further comprising: a slot extending through each shelf; a rod connected to each handle and depending through its associated slot; a washer, of a larger diameter than the width of said slot, movably mounted on each rod below its associated shelf; a spring located below each washer for yieldably urging the washers upwardly on the rods; and a stop member on each rod limiting the extent of upward movement of the washers on the rods; whereby the engagement of the washers with the bottoms of the shelves determines said prescribed locations of the side pincers.

17. The mechanism as defined in claim 16 further comprising: means for adjusting the rods heightwise with respect to their associated handles to thereby adjust the positions of said prescribed locations.

18. The mechanism as defined in claim 17 wherein said means for adjusting the rods heightwise comprises: a finger secured to each handle; a lever pivoted intermediate its ends to each finger; a first pivotal connection between a first end of each lever and the top of its associated rod; a second pivotal connection between the second end of each lever and its associated handle; and means for adjusting the heightwise position of each of said second pivotal connections with respect to its associated handle.

19. A pulling over mechanism for stretching the toe and forepart portions of an upper about the corresponding portions of a last, preparatory to wiping the margins of said upper portions against an insole located on the last bottom, comprising: a frame; a support for supporting bottom-down a shoe assembly that includes the last having the upper draped thereon with the toe end of said assembly facing rearwardly and the heel end of said assembly facing forwardly; a side pincers carrier located on each side of the support; a side pincers mounted to each side pincers carrier for heightwise movement; means mounting each side pincers carrier to the frame for forward-rearward movement; a heel clamp holder, located forwardly of the support, mounted for forward-rearward movement; a heel clamp, having a pair of rearwardly divergent clamping members, mounted to the holder for swinging movement about a heightwise extending axis; locking means operable when actuated to lock the heel clamp against movement about said axis and operable when deactuated to release the heel clamp for movement about said axis; means for initially constraining each side pincers carrier to a prescribed location in a forward-rearward direction; means for initially maintaining each side pincers in an upper position with respect to its associated pincers carrier; means for initially maintaining the heel clamp holder together with the heel clamp in a forward position wherein the heel clamp is remote from the shoe assembly; means for initially maintaining the locking means in a deactuated condition; means for causing each side pincers to grip a forepart portion of the upper margin; means for thereafter applying a force such as to urge each side pincers downwardly with respect to its associated pincers carrier to thereby stretch the upper about the last; means to move the heel clamp holder together with the heel clamp rearwardly so as to cause the heel clamp to bear against the heel portion of the shoe assembly when the stretching operation has been completed; and means operative thereafter to actuate the locking means; whereby the heel clamp holds the shoe assembly against twisting movement on the support while the side pincers carriers together with the gripped upper forepart portions are shifted in forward-rearward directions.

20. The mechanism as defined in claim 19 further comprising: a pair of plungers mounted to the heel clamp holder for inward-outward movement; a wing on the heel clamp located outwardly of each plunger; said plunger and wings serving as said locking means with the locking being in deactuated condition when the plungers are in inner positions disengaged from the wings and the locking means being in actuated condition when the plungers are in outer positions in engagement with the wings.

21. A heel clamping arrangement comprising: a support for supporting a shoe assembly that includes a last having an upper draped thereon with the toe end of said assembly facing rearwardly and the heel end of said assembly facing forwardly; a heel clamp holder, located forwardly of the support, mounted for forward-rearward movement; a heel clamp, having a pair of rearwardly divergent clamping members, mounted to the holder for swinging movement about a heightwise extending axis that is located forwardly of said clamping members; locking means operable when actuated to lock the heel clamp against movement about said axis and operable when deactuated to release the heel clamp for movement about said axis; means for initially maintaining the heel clamp holder together with the heel clamp in a forward position wherein the heel clamp is remote from the shoe assembly; means for initially maintaining the locking means in a deactuated condition; means to thereafter move the heel clamp holder together with the heel clamp rearwardly so as to cause the heel clamp to bear against the heel portion of the shoe assembly; and means operative thereafter to actuate the locking means.

22. The mechanism as defined in claim 21 further comprising: a pair of plungers mounted to the heel clamp holder for inward-outward movement; a wing on the heel clamp located outwardly of each plunger; said plungers and wings serving as said locking means with the locking means being in deactuated condition when the plungers are in inner positions disengaged from the wings and the locking means being in actuated condition when the plungers are in outer positions in engagement with the wings.

23. A pulling over mechanism for stretching the toe and forepart portion of an upper about the corresponding portions of a last, preparatory to wiping the margins of said upper portions against an insole located on the last bottom, comprising: a frame; a support for supporting bottom-down a shoe assembly that includes the last having the upper draped thereon with the toe end of said assembly facing rearwardly and the heel end of said assembly facing forwardly and the bottom of the toe and forepart portion of the shoe assembly lying in a predetermined plane; a front pincers located rearwardly of the support; means mounting the front pincers for heightwise movement in a downward and rearward direction with respect to said plane; a side pincers carrier located on each side of the support; a side pincers mounted to each side pincers carrier for heightwise movement; means mounting each side pincers carrier to the frame for forward-rearward movement; a shelf, that forms a part of the frame, located on each side of the support; an arm located on each side of the support; pivot means mounting each arm to a shelf for swinging movement about an axis that is transverse to the directions of said forward-rearward movement; a handle secured to and extending upwardly of each arm; a slot extending through each shelf; a rod connected to each handle and depending through its associated slot; a washer, of a larger diameter than the width of said slot, movably mounted on each rod below its associated shelf; a spring located below each washer for yieldably urging the washers upwardly on the rods; a stop member on each rod limiting the extent of upward movement of the washers on the rods; the engagement of the washers with the bottoms of the shelves constraining each side pincers carrier to a prescribed location in a forward-rearward direction; means for initially maintaining the front pincers and each of the side pincers in an upper position; means for causing the front pincers to grip the toe end portion of the upper margin and the side pincers to grip the forepart portions of the upper margin; and means for thereafter causing the front pincers to move downwardly and rearwardly in said direction and for causing the side pincers to move downwardly with respect to the side pincers carriers to thereby stretch the toe and forepart portions of the upper about the last with the gripped forepart positions of the upper margin moving rearwardly from said prescribed positions.

24. The mechanism as defined in claim 23 further comprising: means for adjusting the rods heightwise with respect to their associated handles to thereby adjust the positions of said prescribed locations.

25. The mechanism as defined in claim 24 wherein said means for adjusting the rods heightwise comprises: a finger secured to each handle; a lever pivoted intermediate its ends to each finger; a first pivotal connection between a first end of each lever and the top of its associated rod; a second pivotal connection between the second end of each lever and its associated handle; and means for adjusting the heightwise position of each of said second pivotal connections with respect to its associated handle.

26. A method of heel clamping comprising: supporting a shoe assembly that includes a last having an upper draped thereon with the toe end of said assembly facing rearwardly and the heel end of said assembly facing forwardly; providing a heel clamp holder that is located forwardly of the supported shoe assembly; providing a heel clamp, having a pair of rearwardly divergent clamping members, that is mounted to the holder for swinging movement about a heightwise extending axis; providing locking means that are operable when actuated to lock the heel clamp against movement about said axis and are operable when deactuated to release the heel clamp for movement about said axis; initially maintaining the heel clamp holder together with the heel clamp in a forward position wherein the heel clamp is remote from the shoe assembly; initially maintaining the locking means in a deactuated condition; thereafter moving the heel clamp holder together with the heel clamp rearwardly so as to cause the heel clamp to bear against the heel portion of the shoe assembly with the heel clamp swinging about said axis until both clamping members bear against the sides of the shoe assembly; and thereafter actuating the locking means.

References Cited

UNITED STATES PATENTS

| | | | |
|---|---|---|---|
| 247,625 | 9/1881 | Ellithorp | 12—10.1 |
| 3,189,925 | 6/1965 | Kamborian | 12—14.4 |
| 3,399,411 | 9/1968 | Fisk | 12—10.1 |

PATRICK D. LAWSON, Primary Examiner

U.S. Cl. X.R.

12—10.5, 14.4

UNITED STATES PATENT OFFICE
CERTIFICATE OF CORRECTION

Patent No. 3,477,079　　　　　　　　　　Dated Nov. 11, 1969

Inventor(s) Normand Bergeron et al

It is certified that error appears in the above-identified patent and that said Letters Patent are hereby corrected as shown below:

Column 10: line 43, change "forward" to --rearward--; line 45, change "rearward" to --forward--.

Signed and sealed this 12th day of November 1974.

(SEAL)
Attest:

McCOY M. GIBSON JR.　　　　　　　　　C. MARSHALL DANN
Attesting Officer　　　　　　　　　　Commissioner of Patents